(12) United States Patent
Kaufman

(10) Patent No.: US 6,757,366 B1
(45) Date of Patent: Jun. 29, 2004

(54) VOICE MESSAGING SYSTEM HAVING REMOVABLE DIGITAL VOICE MESSAGE MEMORY

(75) Inventor: Steven B. Kaufman, Bridgewater, NJ (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/028,479

(22) Filed: Feb. 24, 1998

(51) Int. Cl.[7] .............................................. H04M 1/64
(52) U.S. Cl. ............................. 379/88.28; 379/88.07; 379/88.22; 379/357.02
(58) Field of Search ........................... 379/67.1, 88.22, 379/88.23, 88.28, 88.25–88.27, 357.02; 455/412, 413

(56) References Cited

U.S. PATENT DOCUMENTS

| | | | | |
|---|---|---|---|---|
| 5,491,774 A | * | 2/1996 | Norris et al. ................ | 704/270 |
| 5,610,774 A | * | 3/1997 | Hayashi et al. ............... | 360/15 |
| 5,648,760 A | * | 7/1997 | Kumar ................... | 340/825.25 |
| 5,687,216 A | * | 11/1997 | Svensson ..................... | 455/412 |
| 5,742,773 A | * | 4/1998 | Blomfield-Brown ........ | 709/228 |
| 5,799,036 A | * | 8/1998 | Staples ....................... | 375/222 |
| 5,819,005 A | * | 10/1998 | Daly et al. .................. | 704/200 |
| 5,928,347 A | * | 7/1999 | Jones ......................... | 710/129 |
| 6,016,472 A | * | 1/2000 | Ali ............................ | 704/500 |
| 6,038,199 A | * | 3/2000 | Pawlowski et al. ....... | 369/29.02 |

OTHER PUBLICATIONS

Harry Newton, Newton's Telecom Dictionary, 3/98, Flatiron Publishing, ISBN 1–57820–023–7, pp. 538–539.*

* cited by examiner

Primary Examiner—R Foster

(57) ABSTRACT

A voice messaging system includes an externally accessible interface for accepting a removable digital memory card for storage of received voice messages. The removable digital memory card may be removed from the voice messaging system to archive previously recorded voice messages. The removed digital memory card may be either re-installed at a later time at the digital voice messaging system for playback, or in another playback device separate from the originally recording voice messaging system for playback. Removal and replacement of digital memory cards on a regular basis provides an unlimited capacity for even the most basic voice messaging devices. A general outgoing greeting message may be recorded in non-removable memory, or it may be customized in separate removable digital memory cards for quick and easy interchange of an outgoing greeting message corresponding to status changes of the user, e.g., one removable digital memory card used while on vacation, another while at work, etc. In this way, recorded voice messages become grouped on separate removable digital memory cards as desired. In heavy volume applications, filled removable digital memory cards containing recorded voice messages may be removed and replaced with empty removable digital memory cards on a regular basis, and the recorded voice messages may be conveniently played back at a separate device without taking the voice messaging system out of service for the telephone line in which it serves.

8 Claims, 4 Drawing Sheets

VOICE MESSAGE DATA SECTOR

VOICE MESSAGE TABLE SECTOR

VOICE MESSAGING SYSTEM HAVING REMOVABLE DIGITAL VOICE MESSAGE MEMORY

BACKGROUND OF THE INVENTION

1. Field of the Invention

This invention relates generally to a voice messaging system. More particularly, it relates to a voice messaging system having archival capability with removable digital voice message memory.

2. Description of Related Art

Today, many people use a digital telephone answering device (digital TAD) or voice mail system to receive and play back voice messages. A conventional digital TAD is typically a stand-alone device which records voice messages from one or two telephone lines in permanently installed digital voice memory (i.e., RAM). A voice mail system is typically used in conjunction with a private branch exchange (PBX) to provide voice messaging capability to a plurality of users. The present invention, while being described herein below with respect to a telephone answering device, is applicable to voice messaging systems in general, including voice mail systems.

FIG. 5 illustrates a conventional voice messaging system such as a digital TAD 200. The conventional digital TAD 200 typically includes a processor 202 for controlling overall functions of the digital TAD 200, and a digital signal processor (DSP) 204 primarily for handling voice processing.

In the conventional fashion, the processor 202 communicates with the DSP 204 using respective serial interfaces 202a, 204a. The processor 202 is connected to read only memory (ROM) 206 containing program code for operation of the processor 202, and random access memory (RAM) 208 for storing variables and other temporary information. A keypad accessible by the user of the digital TAD 200 allows the user to control aspects of the digital TAD 200, e.g., playback and deletion of previously recorded voice messages.

The DSP 204 is connected to ROM 210 containing program code for operation of the DSP 204, and RAM 212 for storage of temporary information primarily for use by the DSP 204. The DSP 204 operates in response to a predetermined program of instructions stored in ROM 210. The DSP 204 also includes a tone generator algorithm to provide DTMF tones to the telephone line 230, and a DTMF detector algorithm to detect DTMF tones. The DSP 204 may also provide a time and date stamp obtained either from a local clock or from call related information (e.g., Caller ID information) received from the telephone company.

The RAM 212 of the DSP 204 includes permanently installed voice memory 212a for storage of digital voice messages. Voice messages are recorded and deleted from the voice memory 212a as desired. Desired voice messages are played back by a voice message recorder/playback module 220, which is connected to a speaker 224 for playback, and to a microphone 222 for recording outgoing message greetings and memos in voice memory.

RAM 208 and/or RAM 212 may be flash memory, dynamic random access memory (DRAM), static random access memory (SRAM), or other suitable re-writable memory. To reduce the physical memory requirements in the digital TAD 200, the DSP 204 includes coding procedures to compress the digital voice messages before storage in the voice memory 212a. The DSP 204 also includes complementary decoding procedures to decompress the digital voice messages for playback by the voice message recorder/playback module 220. Suitable coding/decoding techniques include linear predictive coding (LPC), code excited linear prediction (CELP), vector sum excited linear predictive (VSELP) coding, adaptive differential pulse code modulation (ADPCM), µ-law, or A-law, to name a few. The preferable coding/decoding techniques minimize the amount of data required to represent a voice message at "toll quality" or better.

The digital TAD 200 further includes an analog-to-digital (A/D) converter 214 and a digital-to-analog (D/A) converter 216 for conversion of signals received from a telephone line 230 to and from digital format for processing by the DSP 204. The A/D converter 214 and/or D/A converter 216, although shown external to the DSP 204, may be integrated within the DSP 204. The digital TAD 200 interfaces to the telephone line 230 through a telephone line interface (TLI) 218.

The digital TAD 200 may be controlled by keypad entries entered on a telephone keypad 226 or by dual tone, multiple frequency (DTMF) tones received from remote locations over telephone line 230.

In operation, the TLI 218 of the digital TAD 200 causes an off-hook condition on the telephone line 230 subsequent to receiving a predetermined number of ring signals on the telephone line 230. At that point, the DSP 204 retrieves a previously stored outgoing greeting message (OGM) from the permanently installed voice memory 212a portion of the DSP's RAM 212, and provides the same to the D/A converter 216 for output to the telephone line 230 via the TLI 218. Upon conclusion of the OGM, the caller may leave a voice message for recording in the digital TAD 200. The incoming voice message is converted into a digital signal by the A/D converter 214, and stored in the permanently installed voice memory 212a portion of the RAM 212 of the DSP 204.

Unfortunately, the options as to what may be done with the recorded voice message are limited in the conventional digital TAD 200. For instance, the user may playback the voice message through the voice message recorder/playback module 220 and speaker 224, or may depress a key or keys on keypad 226, or controlled from a remote location, e.g., via DTMF tones, to cause deletion of the voice message from voice memory 212a.

It is sometimes desirable to permanently archive or otherwise physically remove a previously recorded voice message from a digital TAD 200. For instance, it may be desirable to maintain a copy of a message left on the digital TAD 200 for maintaining a record of calls from an unwanted caller. It might also be desirable to record a conversation between two parties talking over the telephone line 230, and to playback the conversation at a location remote from the digital TAD 200 and even remote from a telephone line. However, replay of the recorded conversation in a conventional digital TAD 200 is limited to playback at the digital TAD 200 itself or a telephone in communication with the digital TAD 200.

There is a need for a voice messaging system having the flexibility to allow removal and archival of a voice message recorded at the voice messaging system. There is also a need to provide a voice messaging system which allows convenient playback of a voice message recorded at a voice messaging system, on a separate listening device remote from the digital TAD and the telephone system.

SUMMARY OF THE INVENTION

In accordance with the principles of the present invention, a digital voice memory module for a voice messaging system comprises non-volatile memory, and a separable connector allowing an operable disconnection of the non-volatile memory from a data bus of the voice messaging system.

In another aspect, the present invention provides a voice messaging system including a processor, a voice message recorder/playback module, and a telephone line interface in communication with the voice message recorder/playback module. The system further includes an externally accessible interface in communication with the processor, and allows for installation of a removable voice memory module in connection with the externally accessible interface.

A method and means for recording and archiving a voice message in a voice messaging system is also provided in accordance with the principles of the present invention. A voice message is received and stored in a removable digital memory module. Thereafter, the removable digital memory module is allowed to be removed from the voice messaging system.

BRIEF DESCRIPTION OF THE DRAWINGS

Features and advantages of the present invention will become apparent to those skilled in the art from the following description with reference to the drawings, in which.

DETAILED DESCRIPTION OF THE ILLUSTRATIVE EMBODIMENTS

Conventional digital telephone answering devices (digital TADs) do not provide for archival of a previously recorded voice message. Nor do conventional digital telephone answering devices provide for storage of overflow voice messages beyond that allowed by the permanently installed voice memory, for easy and convenient expansion of voice memory beyond that permanently installed in the voice messaging system, or for playback of a digitally recorded voice message at a device remote from the digital TAD and the telephone system.

The present invention provides an apparatus and method by which digitally recorded voice messages may be removed from the digital TAD, and archived in a way which does not threaten erasure or deletion of the voice messages contained therein. The removed digitally recorded voice messages may either be later re-installed at the digital TAD, or in another playback device remote from the digital TAD and telephone system. The removable voice memory may also provide the capability to expand the voice memory storage capacity for an already installed and operational voice messaging system, particularly a TAD.

Figure 1:
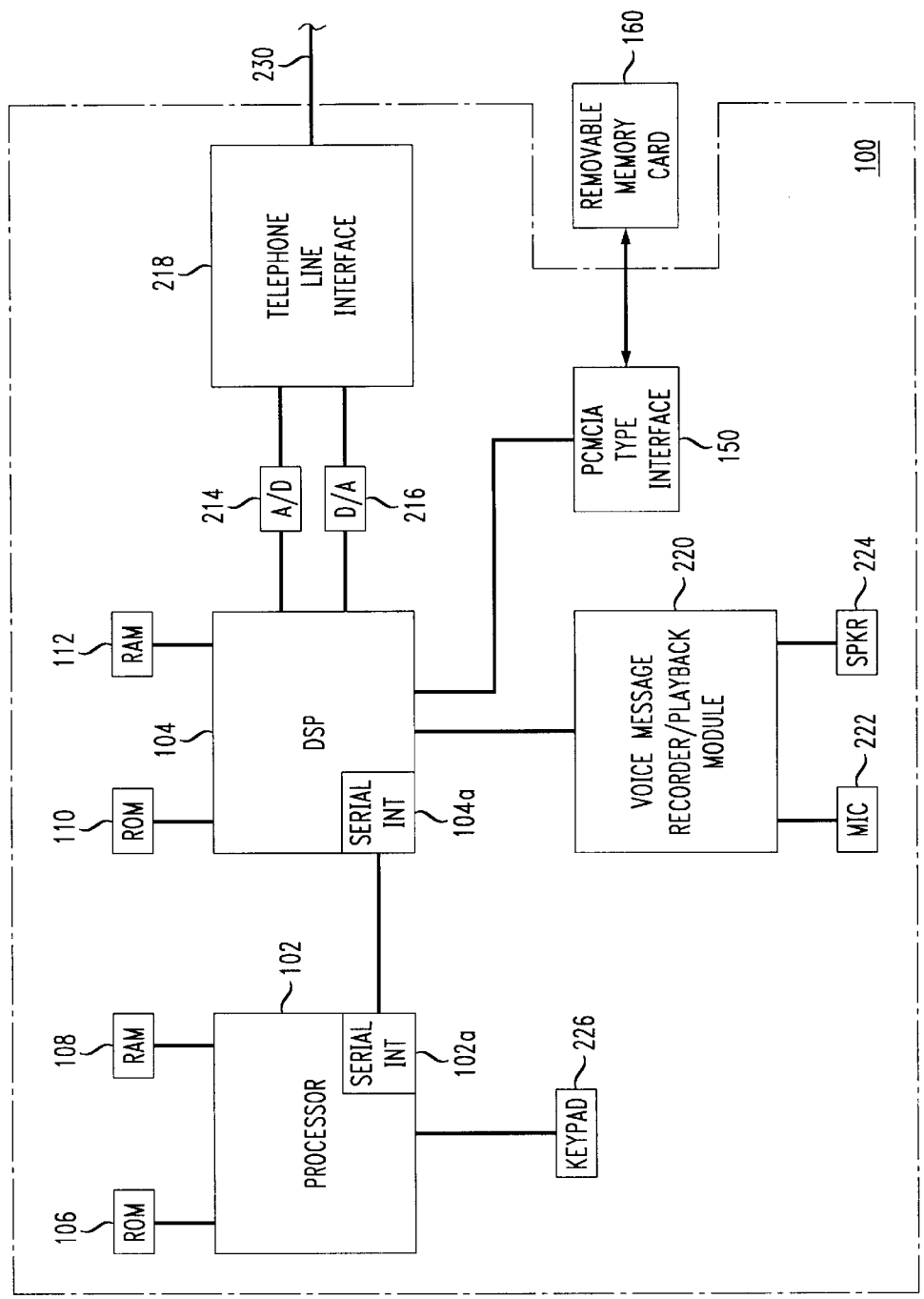
FIG. 1 shows a telephone answering device according to the principles of the present invention.
Figure 5:
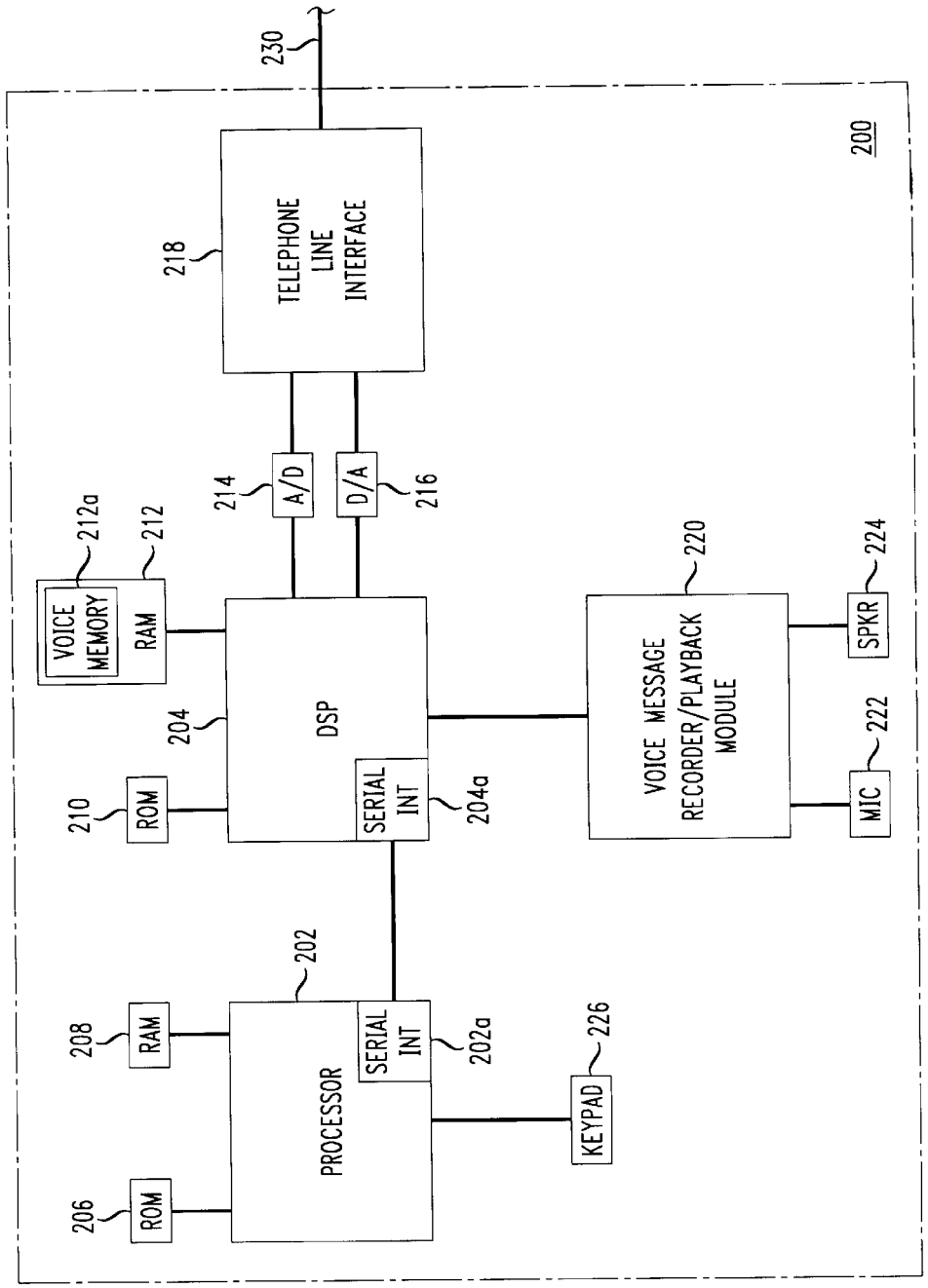
FIG. 5 shows a conventional telephone answering system.

FIG. 1 shows a digital telephone answering device (digital TAD) 100 in accordance with the principles of the present invention. Digital TAD 100 includes a processor 102 connected to RAM 108, ROM 106 and keypad 226. A serial interface 102a of the processor 102 communicates with a corresponding serial interface 104a in the DSP 104. The DSP 104 is in communication with ROM 110 and RAM 112, and a voice message recorder/playback module 220 including a microphone 222 and a speaker 224. The DSP 104 outputs and inputs digital signals to a telephone line 230 via an A/D converter 214, a D/A converter 216, and a TLI 218. These elements individually operate similarly to those in a conventional digital answering machine 200 such as shown in FIG. 5, except as otherwise shown or described herein. Moreover, the features and functions of the digital TAD 100, except as otherwise indicated in the description herein, are as in the conventional digital TAD 500 as shown in FIG. 5.

Although shown separate, the functions of the processor 102 and DSP 104 may either be combined into a single microprocessor, microcontroller, or DSP, or may be distributed among a plurality of microprocessors, microcontrollers, and/or DSPs. The processor 102 and the DSP 104 may be any suitable processor, microcontroller, or DSP.

Moreover, the serial interfaces 102a, 104a may be external devices, such as a universal asynchronous receiver transmitter (UART) device, or the serial interfaces 102a, 104a may be internal devices, such as the known 4-wire Synchronous Serial Interface (SSI).

The inventive digital TAD 100 of FIG. 1 advantageously includes an externally accessible interface 150. The externally accessible interface 150 accepts an electrical connection with a removable digital memory card 160. The externally accessible interface 150 may include any convenient electrical connector for interconnection with the digital memory card 160, together with device logic necessary and intended for frequent (and preferably powered) removal of the mating removable digital memory card 160. Preferably, the externally accessible interface 150 is a personal computer digital memory card international association (PCMCIA) Type II or similar type standard interface 150 for interconnection with an industry standard removable flash digital memory card 160.

The externally accessible interface 150 allows an operable disconnection of the removable digital memory card 160 from the voice messaging system, i.e., the components continue to be operable apart from one another. The TAD 100 will continue to operate, e.g., with a fresh digital memory card 160 installed therein, and the removable digital memory card 160 may be re-installed in the TAD 100 or other device for playback of the voice messages stored thereon.

The removable digital memory card 160 stores a table of voice messages contained in the removable digital memory card 160 (much like a directory of a floppy disk in the computer world), and the underlying digital voice messages. Conveniently, the removable digital memory card 160 may be removed, archived or used otherwise remote from the TAD 100, and replaced with a fresh, empty removable digital memory card 160 as desired.

The removable digital memory card 160 comprises an electrical connector compatible with the externally accessible interface 150 in the digital TAD 100, and any suitable non-volatile memory. While battery backed up static random access memory (SRAM) or electrically erasable programmable read only memory (EEPROM) may be used in the digital memory card 160, flash erasable programmable read only memory (commonly referred to as "flash memory") is preferred because of its ease of in-circuit re-programmability without the need for battery back up.

Flash memory is a non-volatile storage device similar to electrically erasable programmable read only memory (EEPROM), but typically requires erasure of full blocks of memory at any one time. Flash digital memory cards are industry standard cards currently available in sizes ranging from 4 megabytes (Mb) to 40 Mb, and typically operate at various power voltage levels, e.g., 3 volts or 5 volts.

The externally accessible interface 150 as shown in FIG. 1 allows removal of the removable digital memory card 160 at any time, including while the removable digital memory card 160 has power applied thereto from the TAD 100 (i.e., 'hot' removal). While a PCMCIA Type II interface is preferred, another suitable standard interface including Cardbus may be implemented between the externally accessible interface 150 and the digital memory card 160.

Preferably received voice messages are stored directly on the removable digital memory card 160 when received. However, the voice messages may alternatively be stored in permanently installed voice memory of the TAD 100, then downloaded to the removable digital memory card under the control of processor 102 upon request of the user. For instance, important voice messages may be archived from the permanently installed voice memory onto the removable digital memory card 160 for permanent storage, while unimportant voice messages may be simply deleted from the permanently installed voice memory.

Moreover, voice messages may be initially stored in permanently installed memory in the TAD 100, then at a later time (e.g., when the TAD 100 returns to an on-hook condition) automatically transfers one or all voice message from the permanently installed memory in the TAD 100 to the removable digital memory card 160. This feature is particularly useful when real-time processing of the incoming call and storage of the voice message requires fast memory, which is more economically implemented in permanently installed memory in the TAD 100 than in the removable digital memory card 160.

Another application of the present invention is for storage of overflow voice messages when the permanently installed voice memory of the TAD 100 is full or otherwise not able to store the incoming voice message. For instance, when a user is away on a long vacation or business trip and not able to delete voice messages from the TAD 100, the TAD 100 may easily reach its capacity before the user returns to service the TAD 100. Installation of a higher capacity removable digital memory card 160 to store overflow voice messages in such instances will increase the voice memory capacity of the TAD 100 to handle the storage of a larger number of voice messages.

The removable digital memory card 160 may also provide an easy and relatively inexpensive device for expanding the voice memory capacity of an already installed and operational voice messaging system, particularly a TAD, simply by plugging in larger capacity removable digital memory cards 160.

In the downloading process, the format of the recorded voice messages may be changed to a conventional file format, e.g., a .WAV format developed by MICROSOFT, for convenience of a separate playback device. Other example conventional file formats include .AU, .SND, .VCE, .VOX, .SMP, .VOC, .VBA, and .PCM.

When stored directly on the removable digital memory card 160, the voice messages are stored in a conventional manner in the removable digital memory card 160, but all table entries with respect to voice messages relate to addresses within the removable-digital memory card 160. Thus, all addressing links to encoded voice message data stored in the removable digital memory card 160 are with respect to the first byte in the removable digital memory card 160, for the convenience of playback by other devices.

Figures 2A, 2B:
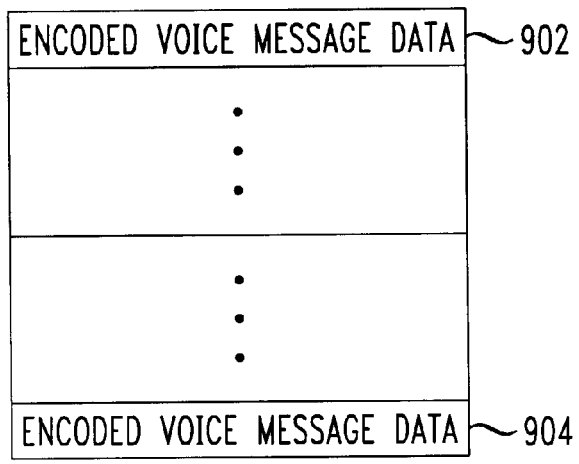
FIG. 2A shows a message table sector of a voice message stored in a removable digital memory card shown in FIG. 1.
FIG. 2B shows a voice message data sector of a voice message stored in a removable digital memory card as shown in FIG. 1.

The voice message data is digitally stored in voice message data sectors 902, 904 as shown in FIG. 2A, together with a respective voice message table for each voice message stored in voice message table sectors as shown in FIG. 2B.

The voice message table shown in FIG. 2B contains various header information relating to underlying voice message data shown in FIG. 2A stored in the same or a linked page of the removable digital memory card 160. Conventional header type information includes a time/date stamp indicating the time and date when an underlying voice message was stored. TAG information in the header contains user defined data. Typically, to maximize efficiency in the digital TAD 100, the voice message data is encoded into a compressed format. Thus, the header includes coder information which relates to the type of encoding used to encode the underlying voice message data, e.g., the particular coder data rate. A new/old information entry in the header of the message table relates to whether or not the underlying voice message has been reviewed at least once by the user of the digital TAD 100. Deleted/non-deleted information in the header conventionally indicates whether or not the underlying voice message has been deleted by the user. A number of bytes in the last sector of memory indicates the length of the voice message in the last sector of memory in which the voice message is stored, avoiding replay of the unused portion of the last sector of memory when replaying stored voice messages. Link list information in the header indicates the addresses of all sectors used to store the voice message. Of course, additional header information, e.g., call related information such as Caller ID telephone number and/or household name, may be included as desired.

For convenience, the outgoing greeting message may be stored in permanently installed memory so that it remains stored in the digital TAD 100 irrespective of which removable digital memory card 160 is installed. In this way empty digital memory cards 160 may be installed easily without requiring re-recording of a new outgoing greeting message.

However, it may in certain circumstances be desirable to store a separate outgoing greeting message in each removable digital memory card 160, i.e., it may be desirable to maintain a plurality of removable digital memory cards 160 for installation in the digital TAD 100 each containing an outgoing greeting message for differing situations. For instance, when the user of the digital TAD 100 is away on vacation, it may be desirable to change the outgoing greeting message by simply installing the designated removable digital memory card 160 in the digital TAD 100 for playing a customized outgoing greeting message and to store therewith vacation related recorded voice messages. In this case, the digital memory card 160 may have an outgoing message stored therein relating to a long absence from the home or office. This feature is especially useful for a user who repeatedly changes status between vacation, home, extended stays at relatives, etc., to provide a convenient and quick way to change the outgoing message. This also results in messages grouped together on separate removable digital memory cards 160, e.g., according to the different status periods.

Figure 3:
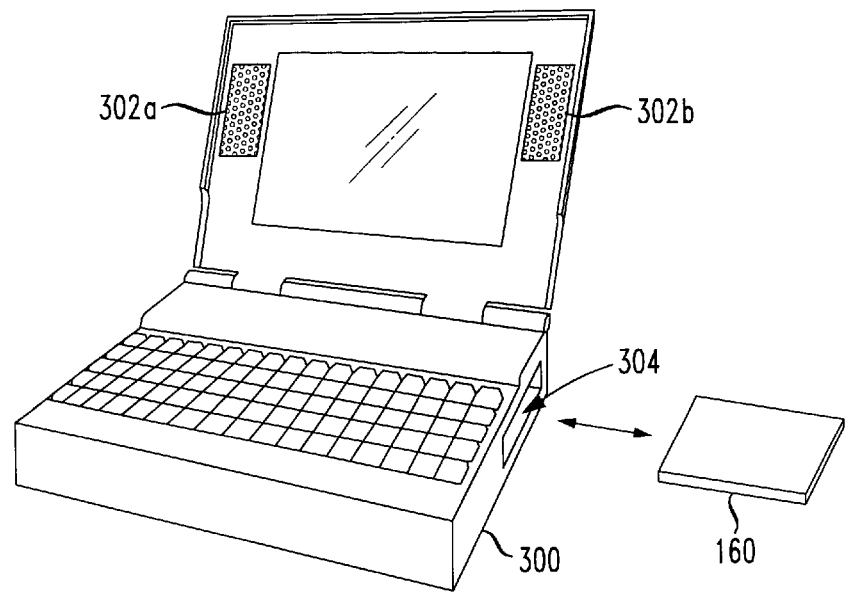
FIG. 3 shows a conventional laptop computer having a PCMCIA Type II interface for accepting a removable digital memory card in accordance with another aspect of the present invention.
Figure 4:
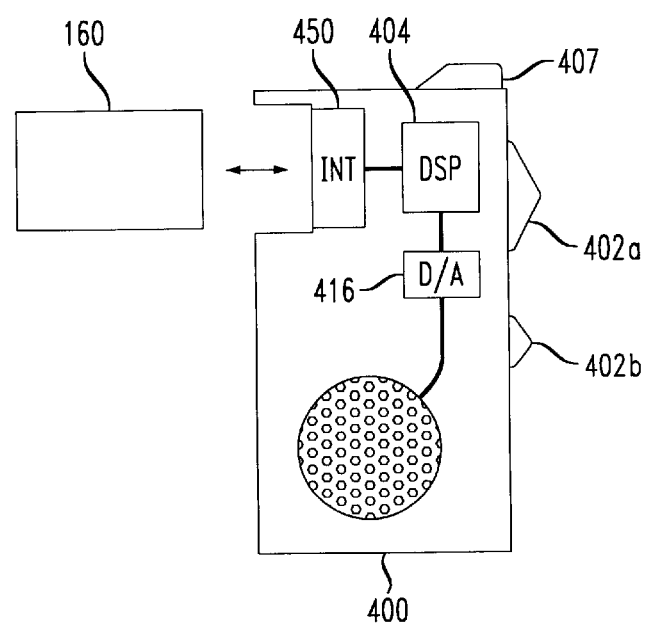
FIG. 4 shows a voice recorder having a PCMCIA Type II interface for accepting a removable digital memory card in accordance with yet another aspect of the present invention.

The digital TAD 100 in accordance with the principles of the present invention may also be applicable in higher volume business applications where a relatively continuous or heavy stream of voice messages are left at a TAD 100 answering a particular telephone number, or in a particular voice mailbox of a voice mail system. In this scenario, the removable digital memory card 160 may be periodically removed, e.g., every hour, and given to an individual separate from the TAD 100 for processing. In this instance, a separate playback device capable of playing back the voice messages stored on removable digital memory cards 160 is used. FIGS. 3 and 4 show examples of such separate playback devices.

For instance, FIG. 3 shows a conventional laptop computer 300 having a PCMCIA Type II externally accessible interface 304. The removable digital memory card 160 includes a complementary PCMCIA Type II connector for interconnection in the interface 304 of the laptop computer 300.

The laptop computer 300 includes a standard audio applications program including an additional procedure for accessing sound files of the format stored on the removable digital memory card 160. The laptop computer 300 displays the header information for each voice message stored on the removable digital memory card 160, and a conventional routine corresponding to the indicated coder 806 (FIG. 2B) decodes (decompresses) the voice message data (FIG. 2A) linked in the link list 814 (FIG. 2B). After decoding, the voice message is directed to a standard laptop computer sound card for playback through standard speakers 302b, or converted to text for, e.g., display on a computer screen.

In another example of a separate playback device for the removable digital memory cards 160, FIG. 4 shows a handheld playback device 400 such as the type conventionally used for dictation. For instance, the handheld playback device 400 includes a microphone 404, and playback and record controls 402a, 402b for conventional recording and dictation. However, the inventive handheld playback device 400 shown in FIG. 4 additionally includes a processor such as a DSP 404, a D/A converter 416, and an externally accessible interface 450 similar to the DSP 104, D/A converter 216 and externally accessible interface 150 shown and described with respect to FIG. 1.

Either the laptop computer 300 as shown in FIG. 3 or the handheld playback device 400 shown in FIG. 4 provide a separate device for playback of the voice messages stored on a removable digital memory card 160 separate from the originally recording TAD 100, and separate from access through a telephone line.

With the provision of removable voice memory in a convenient, standardized format, the digital TAD may serve as a suitable dictation device by recording a message at the digital TAD, removing the flash memory, and handing the same to an administrative assistant to transcribe the conversation. Moreover, removal and replacement of digital memory cards on a regular basis provides an unlimited capacity for even the most basic voice messaging devices implementing the present invention.

While the invention has been described with reference to the exemplary preferred embodiments thereof, those skilled in the art will be able to make various modifications to the described embodiments of the invention without departing from the true spirit and scope of the invention.

What is claimed is:

1. A method of recording a voice message in a telephone answering device, said method comprising:

digitizing a voice message for a voice mailbox in a telephone answering device;

storing said digitized voice message for said voice mailbox in a digital memory module adapted and arranged for repetitive physical separation and physical connection by a user with a portion of said telephone answering device that digitized said digitized voice message;

physically removing said repetitively separable and connectable digital memory module from said portion of said telephone answering device that digitized said digitized voice message;

connecting said physically separable and connectable digital memory module in a separate playback device other than said telephone answering device; and playing back said digitized voice message at said separate playback device.

2. The method according to claim 1, further comprising:

storing a plurality of outgoing greeting messages in a respective plurality of said repetitively separable and connectable digital memory modules; and interchanging an outgoing greeting message from said telephone answering device by interchanging said plurality of said repetitively separable and connectable digital memory modules in said contained telephone answering device.

3. The method according to claim 1, wherein:

said telephone answering device is a digital telephone answering device.

4. The method according to claim 1, wherein:

said separate playback device is a laptop computer.

5. The method according to claim 1, wherein:

said separate playback device is a voice mail system.

6. The method according to claim 1, wherein:

said separate playback device is a handheld playback device.

7. The method according to claim 1, wherein:

said digital memory module is a PCMCIA memory module.

8. A method of recording a voice message in a voice mail system, said method comprising:

receiving a voice message for a voice mailbox of a voice mail system;

storing said voice message for said voice mailbox in a digital memory module adapted and arranged for repetitive removal and installation by a user;

physically removing said repetitively removable and installable digital memory module from said voice mail system;

inserting said physically removable digital memory module in a separate playback device other than said voice mail system;

playing back said voice message at said separate playback device;

temporarily storing said voice message in temporary memory;

changing a format of said temporarily stored voice message; and storing said changed format voice message in said digital memory module when a permanently installed memory is substantially at a capacity condition.

* * * * *